Figure 3:
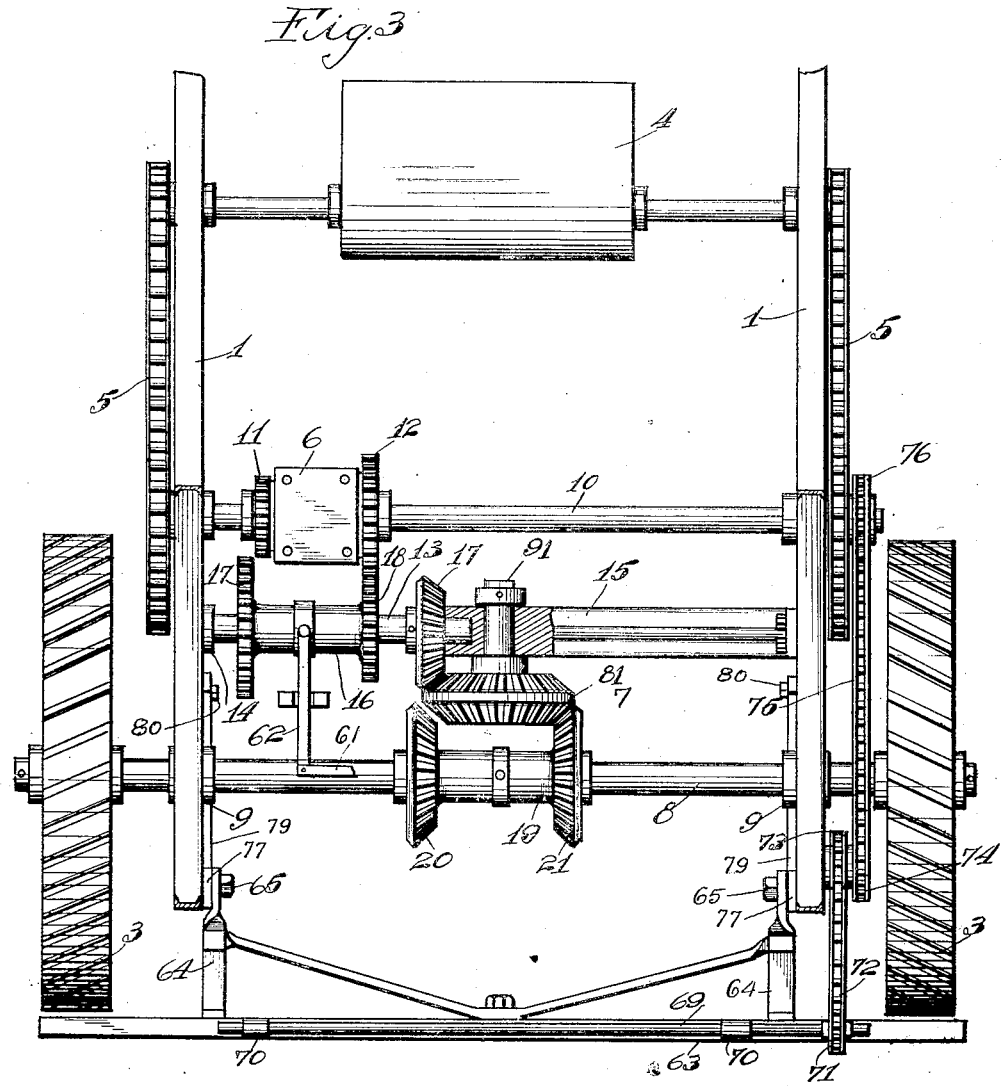

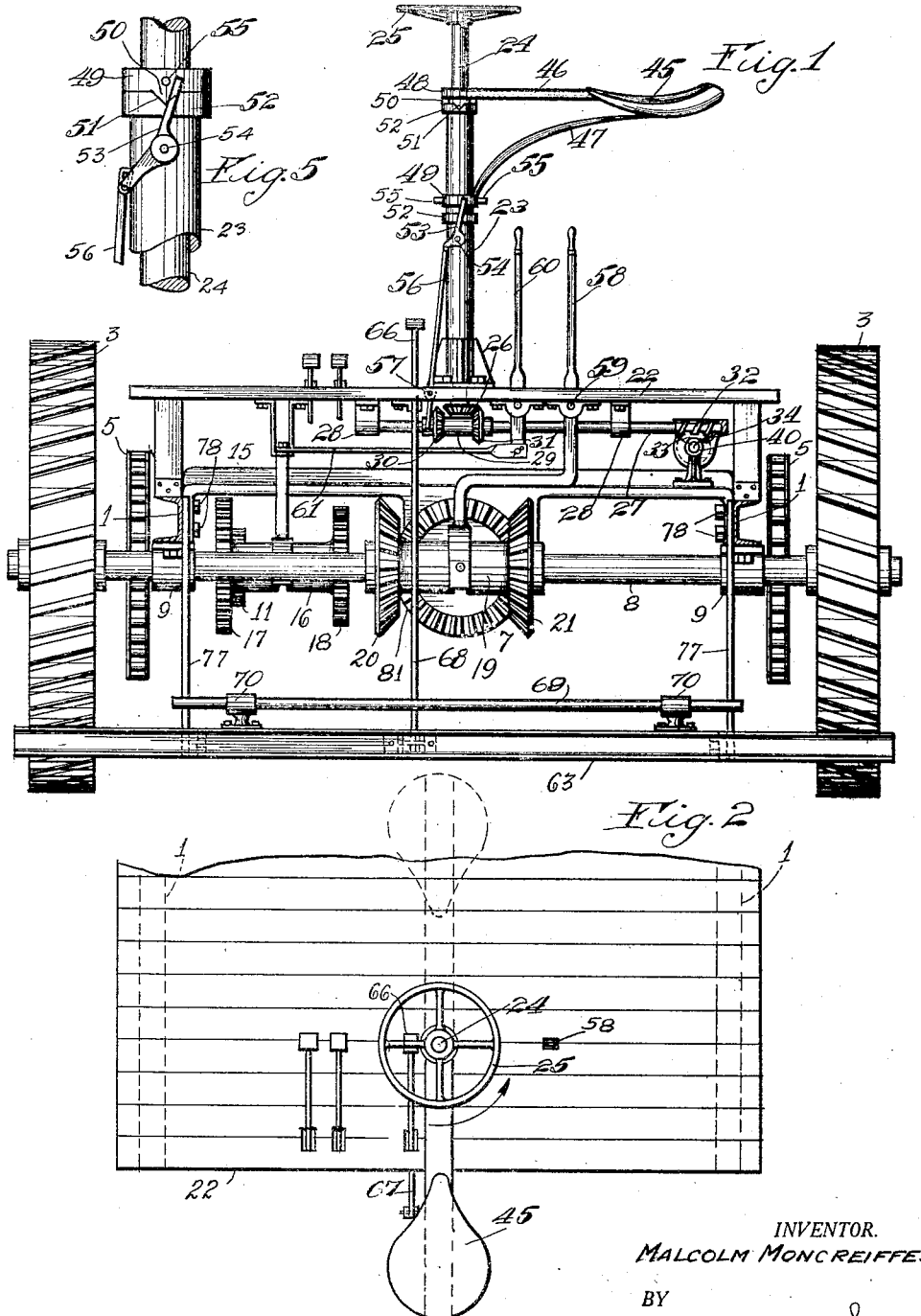

April 12, 1927.  1,624,110
M. MONCREIFFE
TRACTOR
Filed April 12, 1920  2 Sheets-Sheet 2

INVENTOR.
MALCOLM MONCREIFFE
BY
Fisher, Fowle, Clapp & Soans.
ATTORNEY.

Patented Apr. 12, 1927.

1,624,110

UNITED STATES PATENT OFFICE.

MALCOLM MONCREIFFE, OF BIG HORN, WYOMING.

TRACTOR.

Application filed April 12, 1920. Serial No. 373,076.

My invention has reference more particularly to a tractor which is capable of being operated as readily in the rearward direction as in the forward direction and has provision for attaching an implement to the rear end thereof so that the implement is normally operated by "backing up" or rearward movement of the tractor.

Tractors are usually constructed with the controlling mechanism and driver's seat at the rear end and it is customary to attach implements, such as a plow or the like, to the rear end so that the implement is drawn by the tractor. It is, of course, necessary for the driver of the tractor to face forwardly to control the directional movement of the tractor and it is, therefore, difficult for him to continually observe the operation of the trailing implement. Implements may be arranged to be pushed at the front of the tractor, but this presents a similar difficulty as, the driver's seat being at the rear of the tractor, is at a distance from the implement and the forward portion of the tractor intervenes so as to obstruct the operator's view of the implement. Moreover, the directional control of the tractor is usually afforded by turning the front wheels, and with the implement connected at the front end of the tractor, it is difficult to co-ordinate the directional movement of the implement and the front wheels of the tractor and avoid excessive strain on the connections in steering the implement.

In my structure I employ a tractor of any ordinary type in which the driver's seat and controlling devices are arranged in the customary manner at the rear end of the tractor and provide a steering mechanism and controlling devices which are arranged so that the tractor may be operated conveniently in either forward or reverse directions and I also provide attachments at the rear end of the tractor enabling an implement to be attached thereto so as to be pushed by the tractor when the latter is operated in the rearward direction, and have drive mechanism operated from the motor for actuating any mechanism of the implement which is required to be operated.

The principal objects of my invention are to provide a structure which may be applied to the usual type of tractor, such as are at present employed, whereby the tractor may be operated in the rearward direction as readily as in the forward direction; to enable the operator to face either forwardly or rearwardly and have convenient access to, and similar control of the operating mechanisms in either position; to provide a steering mechanism which operates by a similar relative movement with respect to the driver when he is facing in either the forward or rearward direction so that the tractor steers naturally in either position; to provide a steering mechanism with adjustable means automatically operated by changing the position of the driver's seat to effect the desired steering connection for either forward or rearward movement of the tractor; to provide gearing for operating the tractor, enabling the same speed to be obtained in either the forward or rearward directional movement; to provide a pushing attachment at the rear end of the tractor which is adapted for adjustment so as to be connected with various implements; to provide a drive mechanism at the rear of the implement which may be readily connected with the implement to operate the mechanism of the latter; and in general to provide an improved tractor structure of simple and convenient form which may be readily applied to a tractor to enable the latter to be readily operated in either the forward or rearward direction and permitting the tractor to be readily used for pushing an implement attached to the rear end thereof.

Figure 4:
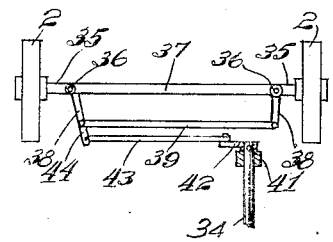

On the drawings, Fig. 1 is a view looking at the rear end of a tractor having my improvements applied thereto; Fig. 2, a fragmentary top view of the rear end of the tractor showing the controlling mechanism and the operator's seat; Fig. 3, a top view of the rear end of the tractor with the platform removed; Fig. 4, a diagrammatic view showing the steering connection with the front wheels of the tractor; and Fig. 5, a fragmentary view of a portion of the steering column showing the mechanism for reversing the steering connection by the adjustment of the operator's seat.

On the drawings, I have indicated somewhat diagrammatically certain parts of a tractor structure which are merely shown to illustrate the application of my invention and it is to be understood that tractors of a form different from that illustrated may be used in connection with my invention. The reference numeral 1 indicates side sills of the tractor frame and 2 and 3, the front and rear supporting wheels respectively, the latter being connected for operation from the motor 4 by the drive chains 5, speed change transmission mechanism indicated generally at 6, and reverse gearing indicated generally at 7, which communicate power to the rear axle 8, which latter is carried in bearings 9 of the frame members 1 and has the wheels 3 secured thereon at opposite ends. The chains 5 connect with sprockets on the ends of a cross shaft 10 which is journaled in the frame members 1 and has spur gears 11 and 12 fixed thereon and serving to afford a high and low speed drive for the rear wheels of the tractor. A shaft 13 is located adjacent and parallel with the shaft 10 and has one end journaled in the tractor frame as indicated at 14 and the other end journaled in a bracket 15 mounted on the tractor frame and this shaft 13 has a sleeve 16 keyed thereon, and provided with gears 17 and 18 at the ends which may be selectively engaged respectively with the spur gears 11 and 12. A beveled gear 17 fixed on the inner end of the shaft 13 meshes with a double beveled gear 81 mounted on a stub shaft 91 which is journaled in the bracket 15. The double beveled gear 81 is positioned adjacent the rear axle 8 and there is a sleeve 19 keyed on the rear axle and having opposed beveled gears 20 and 21 at the ends which may be selectively engaged with the double beveled gear 81.

A platform 22 is mounted on the frame 1 at the rear end of the tractor and has an upright tubular standard 23 rigidly mounted thereon, through which a steering column or shaft 24 extends. A steering wheel 25 is secured to the shaft 24 at the upper end, and a beveled gear 26 at the lower end below the platform 22, and there is a cross shaft 27 journaled at 28 on the under side of the platform and provided with a sleeve 29 keyed thereon for axial movement and having opposed beveled gears 30 and 31 which may be selectively engaged with the beveled gear 26.

The shaft 27 has a worm 32 fixed thereon and meshing with a worm wheel 33 on the forwardly extending shaft 34, which latter connects with the front wheels 2 to control the directional movement of the tractor. The front wheels 2 may be arranged in the usual manner on short spindles 35 which are pivoted at 36 to the opposite ends of the front axle 37 and these spindles 35 have arms 38 connected by a cross rod 39 to effect simultaneous adjustment of the spindles 35 and the front wheels 2 on the pivots 36. The shaft 34 is mounted in suitable bearings 40 and 41 and has a crank 42 at the forward end connected by a link 43 with an extension 44 of one of the arms 38 so that oscillation of the shaft 34 causes a swinging movement of the spindles 35 and directional adjustment of the front wheels.

Steering mechanisms for vehicles, in which a steering wheel is employed, are usually arranged so that a clockwise movement of the steering wheel directs the vehicle to the right and a counter clockwise movement directs the vehicle to the left as this is the natural adjustment for regulating directional control. When the vehicle is reversed and the operator is positioned at the opposite side of the steering wheel, it is necessary to reverse the operation of the steering wheel 25 on the wheels 2 in order that steering of the tractor in the required direction may be effected in the same natural manner as in operating the vehicle in the forward direction. To effect such reverse movement the sliding sleeve 29 is provided so that the beveled gear 31 engages with the beveled gear 26 to provide the steering connection in the forward direction of movement, and the beveled gear 30 engages with the beveled gear 26 to afford the proper steering connection when the tractor is operated in the reverse direction.

The seat 45 is pivotally mounted on the steering column 23 by a pair of arms 46 and 47 which have collars 48 and 49 respectively at their inner ends embracing the steering column, and these collars have lugs or projections 50 on their under faces which engage in recesses 51 provided therefor in annular flanges 52 of the column 23, so as to determine the proper positions of the seat for operating the tractor in the forward or reverse directions and for holding the seat in both of these adjusted positions. A lever 53 is pivoted at 54 on the standard 23 and has one arm thereof positioned so as to be engaged by pins 55 on the collar 49 and the other arm of this lever is connected to the upper end of a lever 56 which latter is pivoted intermediate of its ends at 57 on the platform 22 and has the lower end engaged with the sleeve 29 so as to effect the proper axial movement thereof to selectively engage the beveled gears 30 and 31 with the beveled gear 26. The pins 55 are suitably arranged so that when the seat 45 is swung to the position indicated by the full lines in Fig. 2, the gear 31 is engaged with the beveled gear 26 and affords the proper steering connection for operating the tractor in the forward direction and when the seat is swung to the position indicated by dotted lines in Fig. 2, the beveled gear 30 is engaged with the beveled gear 26 and affords proper steering connection for operation of the tractor in the required direction.

In operating the tractor in the reverse direction to push an implement, it is desirable to have speeds change as in the movement of the tractor forwardly and this is accomplished by placing the speed change transmission 6 ahead of the reverse gearing 7 so that power is communicated to the rear wheels 3 through the change speed gears 11 and 12 in either position of the reverse gear mechanism 7. A lever 58 is pivoted at 59 and extends up above the platform 22 so as to be conveniently accessible to the operator in the seat 45 in either of the positions to which the seat may be adjusted and the lower extremity of this lever connects with the sleeve 19 for shifting the latter axially along the shaft 8 to control the reverse gear 7.

Another lever 60, similarly mounted, is connected by a link 61 with a lever 62 which connects with the sleeve 16 and is operable to adjust said sleeve to engage the spur gear 17 with the gear 11 and release the gear 18 from engagement with the gear 12 or vice versa.

Secured to the rear end of each frame member 1 is a depending bar 77 which is rigidly bolted at 78 to the frame member and has a brace 79 connected at one end to the lower end of the bar 77 and at the other end to the frame member 1, as indicated at 80. A pusher bar 63 is secured to the outer ends of two hangers 64, each of which is secured at its inner end, respectively, to the lower end of one of the bars 77 by a bolt 65 which enables the pusher bar 63 to be adjusted to the necessary elevation required by the implement which is pushed by the tractor. A pedal 66 is mounted on the platform 22 so as to project thereabove and has an arm 67 underneath the platform connected to the upper end of a link 68 which is connected at its lower end to the inner side of the pusher bar 63 so that the elevation of said pusher bar may be regulated by the operator on the platform by means of the pedal 66.

Many implements require a power drive for operating the mechanism thereof and in order to enable a power drive to be afforded for the implement from the motor of the tractor, there is a shaft 69 journaled in bearings 70 on the pusher bar 63 and provided with a sprocket 71 which is connected by the chain 72 with a sprocket 73 on the frame 1 adjacent one of the pivot bolts 65, the location of the sprocket 73 adjacent the pivot bolt 65 permitting adjustment of the pusher bar 63 without materially affecting the distance between the shaft 69 and the sprocket 74. The sprocket 72 is integral with or connected with the sprocket 73. which latter is driven by the chain 75 from a sprocket 76 of the shaft 10 to which power is applied from the motor of the tractor. Obviously the shaft 69 is constantly driven when the motor is in operation, and a drive pulley or sprocket or other suitable connection may be provided on the shaft 69 at any point throughout its length, for communicating power to the implement which is propelled by the tractor.

In using this tractor, the implement to be propelled is placed at the rear end of the tractor and connected therewith so that the pusher bar 63 engages thereagainst, said bar having been previously adjusted at the proper elevation to engage against the desired part of the implement. If a driving connection is required with the motor of the tractor, such connection is made with the shaft 69 in any convenient manner, as will be readily understood. The seat 45 is then swung around to the position shown by dotted lines in Fig. 2 and such adjustment of the seat automatically engages the beveled gear 30 with the beveled gear 26 and thus affords the proper connection of the steering wheel 25 with the front wheels so that as the operator occupies the seat 45 and faces toward the rear of the tractor, a clockwise movement of the steering wheel 25 results in a steering of the tractor to the right and a counter clockwise movement of the steering wheel results in directing the tractor toward the left. The operating levers and pedals are all arranged so as to be conveniently accessible to the operator in either position of the seat 45 and in the reverse direction of movement of the tractor the two changes of speed are available by shifting the lever 60 in the same manner as in operating the tractor in a forward direction.

It will be observed that when the tractor is operated in the rearward direction the steering wheels 2 are at a distance from the propelled implement, and change in the direction of movement of the implement may be readily effected while the tractor is moving along, without the excessive strain on the implement which would result if the implement were propelled at the front of the tractor.

While I have shown and described my invention in a particular form, I am aware that various changes and modifications may be made without departing from the principles of my invention and I, therefore, do not purpose limiting the patents granted hereon otherwise than necessitated by the prior art.

I claim as my invention:

1. In a self propelled vehicle, the combination of a motor, a reversible power transmission gearing for propelling the vehicle in a rearward direction, a vertically adjustable pusher bar extending across the rear of the vehicle and a shaft on the pusher bar extending across the rear of the vehicle and operable from the motor.

2. In combination in a vehicle having a drive wheel at one end and a guide wheel at the opposite end, means for selectively propelling the vehicle in either direction of travel; steering mechanism for controlling the guide wheel and comprising an upright support on the vehicle, a steering column rotatably supported by said upright support, controlling means at the upper end of said column for rotating the latter and a steering gear secured to the lower end of the column, a horizontally disposed shaft for controlling said guide wheel, a gear member non-rotatably but slidably mounted on said shaft and adapted to be adjusted so as to selectively mesh with diametrically opposite sides of said steering gear, whereby rotation in one direction of the steering column may be transmitted to rotation of said shaft in either direction according to the position of adjustment of said gear member and whereby the same movement of said controlling means is operable to similarly guide the vehicle in either direction of travel; a seat revolubly mounted on said support and adapted to be swung thereabout to face either forwardly or rearwardly of the vehicle, and locking means controlled by the weight of the seat for maintaining the seat in either position of adjustment; and means for effecting adjustment of said gear member and operable as an incident to swinging of said seat from one position to the other without materially varying the height of said seat or controlling means.

Chicago, Ill., March 16th, 1920.

MALCOLM MONCREIFFE.